United States Patent [19]

Wuerker et al.

[11] 3,735,283
[45] May 22, 1973

[54] BEAM DIAMETER CONTROL FOR P LASER HAVING IMPROVED COHERENCE

[75] Inventors: Ralph Frederick Wuerker; Lee Opert Heflinger, both of Los Angeles, Calif.

[73] Assignee: TRW Inc., Redondo Beach, Calif.

[22] Filed: June 23, 1971

[21] Appl. No.: 155,730

[52] U.S. Cl................................................331/94.5
[51] Int. Cl................................................H01s 3/10
[58] Field of Search......................331/94.5; 350/160

[56] References Cited

UNITED STATES PATENTS

| | | | |
|---|---|---|---|
| 3,365,678 | 1/1968 | Maurer | 331/94.5 |
| 3,493,885 | 2/1970 | Sorokin | 331/94.5 |
| 3,500,234 | 3/1970 | Goedertier | 331/94.5 |
| 3,513,409 | 5/1970 | Polk et al. | 331/94.5 |
| 3,560,871 | 2/1971 | Chen | 331/94.5 |
| 3,414,836 | 12/1968 | Clark et al. | 331/94.5 |

*Primary Examiner*—William L. Sikes
*Attorney*—Daniel T. Anderson, Edwin A. Oser and Jerry A. Dinardo

[57] ABSTRACT

A pulsed laser and preferably one with a solid laserable material is caused to oscillate substantially in a single mode to increase its coherence length. This is accomplished by the provision of one or more dye cells containing a saturable absorber for the optical radiation of the laser. This combined dye cell has a length of no less than ¼ and no more than ⅔ that of the optical cavity and preferably a length of approximately ½ that of the cavity. Due to the provision of such a long dye cell the initial mode of oscillation of the laser is favored and the dye cell discriminates to a substantial extent against all other oscillating modes. Discrimination against unwanted modes is improved by controlling the size of the beam diameter passing through the dye cell. This permits independent control of the initial transmission of the dye cell by controlling the concentration of the dye, and the extent of bleaching during the pulse by controlling the beam diameter and hence light intensity within the cell.

4 Claims, 4 Drawing Figures

Patented May 22, 1973

Ralph F. Wuerker
Lee O. Heflinger
INVENTORS

BY

ATTORNEY

Ralph F. Wuerker
Lee O. Heflinger
INVENTORS

BEAM DIAMETER CONTROL FOR P LASER HAVING IMPROVED COHERENCE

CROSS REFERENCE TO A RELATED APPLICATION

The present application is related to a co-pending application to Lee O. Heflinger filed concurrently herewith and entitled "Pulsed Lasers Having Improved Coherence Control," Ser. No. 155,729, and assigned to the assignee of the present application. This co-pending Heflinger application discloses a laser having a long dye cell used for the present invention.

BACKGROUND OF THE INVENTION

This invention relates generally to pulsed lasers, and particularly relates to an improved longitudinal mode control therefor for the purpose of improving the coherence length.

It has long been recognized in the art that the coherence length of pulsed lasers and particularly of lasers having a solid laserable material is severely limited. This is particularly true, for example, of a pulsed ruby laser. Therefore, many attempts have been made in the past to improve the temporal or longitudinal coherence of a pulsed laser. This would permit to utilize pulsed lasers with their inherent advantages instead of gas lasers.

One of the great advantages of a pulsed ruby laser is its very high light output. This in turn makes it possible to take, for example, holograms in a very short period of time on the order of microseconds and even shorter. On the other hand, the relatively low light output of most gas lasers makes it impossible, for example, to take holograms in such short periods of time. This is, of course, of great importance because in order to obtain a good holographic recording it is necessary that the object remain stationary within a fraction of a wave length during the time of exposure.

Various attempts have been made in the past to improve the coherence length of pulsed lasers such, for example, as a ruby laser. To this end, various mode controls have been developed. These include, for example, the resonant cavity of the laser and various optical resonators, such, for example, as a Fabry-Perot interferometer. It has also been proposed to utilize a dye cell for this purpose. Such a dye cell contains a saturable absorber. This is a dye such as a photochromic material which normally absorbs the wave length of the optical radiation generated by the laser, but can be bleached by the light of the laser, whereafter it transmits the optical radiation. This bleaching process is caused by the molecules of the absorber absorbing the light and thereby being excited to an upper excited state in which the molecule is now transparent to the light.

In general, it is believed that a saturable absorber or dye cell operates as follows. When the laser starts to lase a standing light wave is set up in the optical cavity. Usually the optical cavity is formed by two reflectors, one of which reflects all of the light while the other permits a portion of the light to pass out of the cavity. Accordingly, the resonant optical wave is a full standing wave between the 100% light reflector and the laserable material, while in the region between the laserable material and the output reflector there is a continuation of traveling and standing waves.

In any case, the standing light wave will bleach the saturable absorber at the antinodes of the wave. This will then, in a manner of speaking, lock in the initial mode which has been set up and discriminate to a certain extent against other modes.

However, it has been found that while such dye cells do improve the temporal coherence of the laser, the improvement is not as great as should be desired. It should also be emphasized that prior art dye cells are relatively short and extend through a small fraction of the entire length of the optical cavity.

A prior U.S. Pat., No. 3,414,836, granted on Dec. 3, 1968 to George L. Clark and Ralph F. Wuerker, one of the co-inventors of the present application, relates to a Q-switched laser. In accordance with the teachings of this patent a ruby rod is used as a Q-switch. The ruby rod is inserted into the optical cavity and initially holds off lasing of the laser until the molecules of the ruby rod absorber have been excited to the upper state. In accordance with the teachings of this patent, the ruby rod absorber may be bleached completely because once the ruby laser fires there is no longer any need for an absorber.

Thus, the ruby rod absorber of the Clark and Wuerker patent is used solely as a Q-switch but not for the purpose of discriminating against undesired modes. Furthermore, as shown in the Clark et al. patent the diameter of the laser beam is decreased in size before it enters the ruby absorber rod. This is for the purpose to decrease the length and size of the ruby absorber. This is necessary in order to make sure that the ruby absorber may be fully bleached without absorbing excessive energy from the output light.

It is, therefore, an object of the present invention to provide a pulsed laser, particularly one having a solid laserable material with an improved coherence control.

A further object of the present invention is to provide a pulsed solid laser with a long dye cell including a saturable absorber and a lens system for changing the diameter of the laser beam between the laser and the dye cell to provide better control of the discrimination afforded thereby to undesired modes.

Another object of the present invention is to provide a pulsed laser of the type discussed which permits essentially to control independently the concentration of the dye of the dye cell for opacity and the beam diameter so as to effectively vary the cross-section for the absorption of light of the dye molecules.

SUMMARY OF THE INVENTION

A pulsed laser in accordance with the present invention incorporates longitudinal mode control which will improve its coherence length. Such a laser comprises a laserable material as well as means for pumping the material to develop an optical radiation. A first and a second reflector are provided for reflecting the optical radiation. These reflectors define an optical cavity and enclose the laserable material. In a conventional manner the first reflector reflects substantially all of the optical radiation while the second reflector reflects only a portion of the optical radiation and therefore transmits the remaining portion of the radiation. Thus, the second reflector may be called the output reflector.

Further, in accordance with the invention of the co-pending Heflinger application, there is provided a dye cell in the cavity. The dye cell contains a saturable absorber for the optical radiation, that is a material normally moderately opaque to the optical radiation, but which when excited by the optical radiation becomes transparent thereto. The dye cell has a length of no less than ¼ of that of the cavity and preferably has a length of ½ the cavity.

In accordance with the present invention there is provided lens means between the dye cell and the laserable material. The lens means controls the cross-section of the beam of the optical radiation and thereby the intensity of the optical radiation in the dye cell. This will optimize the coherence control provided by the dye cell. It permits the independent control of the concentration of the dye molecules sufficient to provide moderate opacity of the cell in its unexcited state and also permits control of the effective cross-section of the dye molecules to their absorption of light.

The novel features that are considered characteristic of this invention are set forth with particularity in the appended claims. The invention itself, however, both as to its organization and method of operation, as well as additional objects and advantages thereof, will best be understood from the following description when read in connection with the accompanying drawings.

DESCRIPTION OF THE PREFERRED EMBODIMENT

Figure 1:
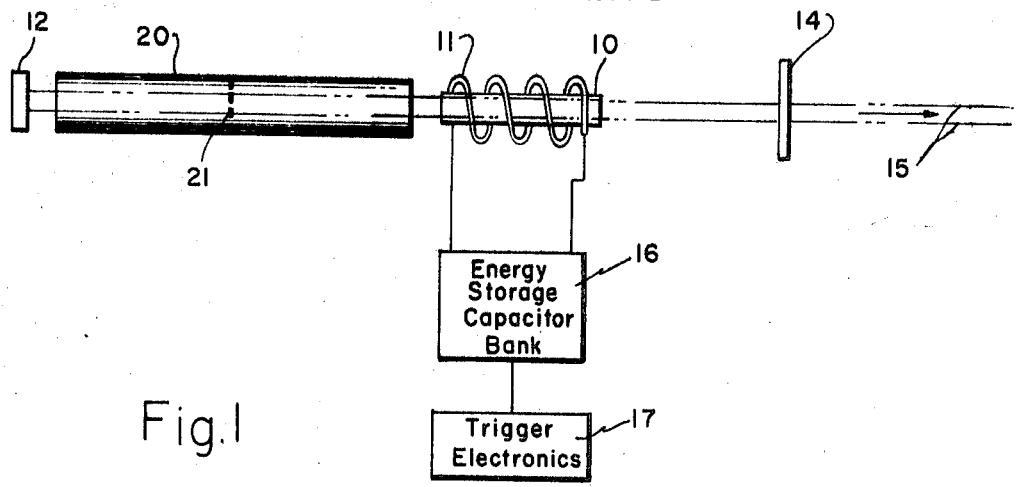
FIG. 1 is a schematic representation of a pulsed laser embodying a dye cell and including in block form the electronics for triggering the laser.

Referring now to the drawings, and particularly to FIG. 1, there is illustrated a pulsed laser embodying the co-pending Heflinger invention. The pulsed laser may include any laserable material capable of being pulsed. Thus, the laser may, for example, be a gaseous laser containing carbon dioxide. Preferably, however, the laser includes a solid laserable material such as a ruby rod 10 as shown in FIG. 1. Alternatively, the solid laserable material may consist of neodymium in yttrium-aluminum-garnet, or neodymium in glass, or the laser may be an erbium laser.

The ruby rod may be provided with a suitable means of pumping the laserable material into an upper excited state. To this end there is conventionally provided a flash lamp 11 which optically excites the ruby rod 10. The ruby rod 10 is disposed in an optical cavity formed by a first reflector 12 and by a second or output reflector 14. The reflector 12 may consist of any suitable material such as a mirror with a dielectric coating which reflects substantially all of the optical radiation generated by the laser. The output reflector 14 is so arranged that it reflects only a portion of the optical radiation and permits the remainder of the radiation to leave the optical cavity to provide an output beam 15. Thus, the output reflector 14 may have a suitable dielectric coating and may, by way of example, have a reflectivity on the order of 55 percent. Alternatively, the output reflector may consist of a multiple surface reflector such as a plate of sapphire and known as a resonant reflector.

The flash lamp 11 may be supplied in a conventional manner with electrical energy by an energy storage capacitor bank shown schematically by a block 16. There may also be provided an electronic trigger such as shown by bthe block 17 for triggering the capacitor bank 16, thereby to initiate operation of the flash lamp 11. This in turn will start the pumping of the laser into an upper excited level to provide an inverted population and at some predetermined time later the laser will then issure a light pulse.

The laser of FIG. 1 as described so far is entirely conventional. The laser is pulsed to issue a light pulse some time after the occurrence of the trigger developed by the trigger electronics 17. It will be appreciated that there may be a certain amount of jitter, meaning that there is a time delay of variable duration between the instant when the flash lamp is first ignited and the instant when the laser pulse appears. If it is desired to issue a laser pulse at an exactly known time it may be desired to utilize an electronic Q-switch in addition to a dye cell.

In accordance with the invention of the co-pending Heflinger invention there is provided a dye cell 20 within the optical cavity defined by reflectors 12 and 14. This dye cell 20 may operate in the manner of a Q-switch and should, of course, be initially partly transparent to the optical radiation of the laser. It has a length of no less than ¼ the length of the optical cavity and of no more than ⅔ of the length of the cavity. Preferably, its length is approximately ½ the length of the cavity.

It has also been found experimentally and proven by mathematical theory that the position of the dye cell is of importance. As indicated before, an optical standing wave is set up in the space between the reflector 12 and the ruby rod 10. On the other hand, in the space between the ruby rod 10 and the output reflector 14 there usually exists not only a standing optical wave, but a travelling wave, which of course is the output wave. The significance of this will be subsequently explained.

The dye cell 20 is filled with a suitable saturable absorber for the optical radiation generated by the laser. As explained before, such a saturable absorber may be considered to be a photochromic material of the type that is normally moderately opaque to the optical radiation but becomes bleached by the action of light.

It should be emphasized here that instead of a single dye cell 20, two or more dye cells of the same length as cell 20 may be provided. Also, it is not necessary that the dye cell 20 operate as a Q-switch. It is still capable of controlling the modes of the laser even if it does not function as a Q-switch, for example, if the saturable absorber has a very short lifetime or under steady state conditions.

A simple explanation of the operation of the dye cell 20 is as follows.

Initially, the dye is nearly opaque to the radiation of the laser. Consequently, it increases the loss of the laser so that the laser will not be able to oscillate during the initial portion of the pump period. However, as the pumping proceeds and as the gain of the laser rod 10 thereby increases, eventually the overall laser gain exceeds the loss and lashing begins. As the oscillation within the optical cavity builds up the molecules of the dye which absrob the light are excited or raised to their upper state due to the absorption of photons of light. Therefore, the number of dye molecules available which are still capable of absorbing light diminishes. As a result, the cavity loss decreases which now permits a very rapid buildup of oscillation. This continues at a high level until the excited molecules of the laser rod have been depleted whereupon oscillation stops.

The important point in accordance with the Heflinger invention is the precise physical location of tthe dye molecules which have been bleached or excited so as to become transparent. Another important aspect of this is the time duration during which an excited dye molecule, which has previously absorbed a light photon, remains in its upper state. Preferably, the excited dye molecule has a lifetime which is on the order of the duration of the laser pulse. This lifetime depends not only on the dye but also to a certain degree on the solvent used for the dye.

It will, therefore, be seen that the particular dye or saturable absorber should have certain preferred properties. Such dyes are generally well known. Among these are cryptocyanine which is known chemically as 1,1' -diethyl-4,4' -carbocyanine iodide($C_{25}H_{25}N_2I$). Generally, cryptocyanine is used with a solvent such as ethyl alcohol. It is suitable for use with a ruby laser.

Another saturable absorber or dye which may be used for a ruby laser is known as D.D.I. which is known chemically as 1,1' -diethyl-2,2' -dicarbocyanine iodide ($C_{27}H_{27}N_2I$). D.D.I. is also usually used with ethyl alcohol solution as a solvent. Another dye which may be used is shown as vanadyl phthalocyanine and has the following formula: vanadyl phthalocyanine $(C_8H_4N_4)_4$ VO. This dye may be dissolved in nitrobenzene.

Finally, it is possible to use chlorophyll as the dye. This may, for example, be used with alcohol or a suitable oil as a solvent.

As indicated before and shown in FIG. 1, the dye cell 20 preferably has a length of approximately ½ that of the optical cavity. It is preferably disposed between the reflector 12 and the ruby rod 10 because in this region the standing wave pattern is the most complete. Accordingly, the saturable absorber is bleached at the antinodal points of the standing optical wave. If the dye cell is disposed between the ruby rod 10 and the output reflector 14 the travelling wave in turn will tend to effect some bleaching of the saturable absorber even at the nodes of the standing wave component. Therefore, the cell will be somewhat less effective in discriminating against undesirable modes.

Thus, it has been found that a ruby laser in accordance with FIG. 1 has a coherence length of no less than 25 feet, the limit being given by the size of the room in which the laser was operated to obtain holograms. This indicates that the laser was essentially oscillating in a single mode. Generally, the mode of a laser tends to change while it is lasing. This is due to the fact that the index of refraction of the ruby changes with temperature and the fact that the index of refraction is a function of the unexcited population of molecules and therefore changes during the lasing. However, with a long dye cell in accordance with the invention, the mode becomes locked by the dye cell because it tends to discriminate against other unwanted modes.

When the laser of FIG. 1 lases, a standing wave of the optical radiation is set up not only in the space between the reflector 12 and the ruby rod 10, but also in the ruby rod itself. Accordingly, the excited, inverted molecules are depleted principally at the antinodes formed within the ruby rod 10. This, of course, eventually decreases the gain for the initial mode. On the other hand, it leaves the gain high for any other mode with its antinodes located approximately where the original nodes were. Therefore, it will be appreciated that the ruby rod 10 acts in a manner opposite to the function of the dye cell 20 and tends to cause mode shifting.

It can be shown theoretically that if the duration of the laser pulse is on the order of a microsecond or more, the bleached or excited molecules will migrate away from the antinoidal planes due to Brownian movement. This may be inhibited to a certain extent by selecting a solvent having a high viscosity. This is only necessary where the pulse duration is so long that the dye molecules will migrate over a least a fraction of a wavelength during the duration of the pulse. Such a high viscosity solvent may simply consist of a high viscosity mineral oil or glycerol transparent to the radiation of the laser.

By utilizing a photochromic material which is either in solid form or embedded in a solid, the detrimental effects of Brownian motion are eliminated. Thus, it is feasible to utilize a photochromic glass of the proper length and the proper density of the photochromic material. Furthermore, a photochromic glass has the advantage that the lifetime of the bleached state is very long, on the order of minutes or more, so that it would be possible to pulse the laser repeatedly without changing the frequency of the light output. This, in turn, would make possible interferometric work such as double exposure holography without any danger of shift of the frequency or wavelength of the laser between successive exposures.

Figure 2:
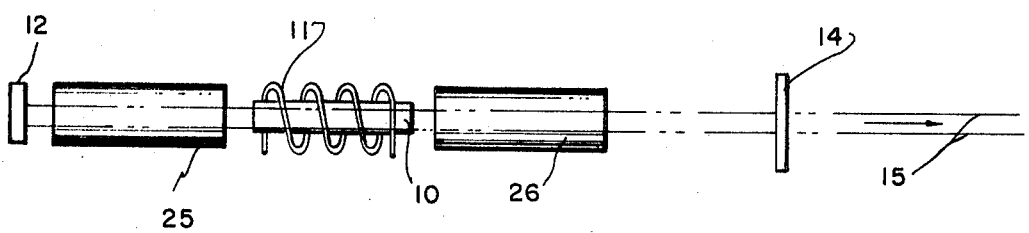
FIG. 2 is a schematic representation of a modified laser without, however, including the electronics.

Before explaining the mathematics on which the present invention is based, it is believed to be convenient at this point to discuss a second embodiment as illustrated in FIG. 2. This again includes a ruby rod 10 with a flash lamp 11, a reflector 12 and an output reflector 14.

In this case, however, a first dye cell 25 is disposed between the reflector 12 and the ruby rod 10, the dye cell 25 and ruby rod 10 occupying approximately ½ of the length of the optical cavity so that the dye cell 25 has a length of at least ¼ that of the optical cavity.

There is also disposed a second dye cell 26 between the ruby rod 10 and the output reflector 14. The second dye cell 26 may have a length of no less than ¼ and approximately ½ that of the optical cavity. The reason for the second dye cell 26 will not be explained. It will be understood that each dye cell 25 and 20 may be replaced by a plurality of dye cells of the same length.

This tendency may be minimized if the ruby is placed as in FIG. 2 approximately at the center of the cavity. Additionally, the second dye cell 26 has a high dissipation for unwanted for adjacent modes of the initial mode and therefore counteracts the tendency of the ruby rod to cause mode shifting. A simplified explanation of this phenomenon is that both the ruby rod 10 and the dye cell 26 are located approximately at the center of the cavity and their influences are opposed and hence tend to cancel each other.

A mathematical model has been developed to explain the operation of such a long dye cell. This is, of course, a simplified model where it has been assumed that the initial mode of the laser bleaches the saturable absorber or dye proportional to its intenstiy and proportional to the exposure time. On this basis the absorption for other unwanted modes may then be calculated. With this assumption, the following formula may now be derived.

$$F_1 = \frac{1}{\pi} \int_0^\pi e^{-\alpha \sin^2 v} dv \qquad (1)$$

In this formula $F_1$ is a function obtained by assuming that the saturable absorber has a long decay time. $\pi$ has the usual meaning, that is the ratio of the circumference to the diameter of a circle, and $e$ is the base of the natural logarithm. $v$ is defined as follows: $v = k_0 x$ and wherein $k_0$ is the wave number, $k_0 = 2\pi/\lambda_0$, $\lambda_0$ being the wavelength of the initial mode generated by the laser.

In this formula $\alpha$ is defined as follows:

$$\alpha = \frac{\sigma}{h\nu} \int_0^t i_0(t) dt \qquad (2)$$

wherein $\alpha$ is the cross-section of the saturable absorber for the absorption or emission of light $\nu$ is the frequency of the light while $i_0(t)$ indicates the light intensity as a function of time which is O at the beginning of time. Finally, $h$ is Planck's constant.

With the same assumption, that is a long decay time for the saturable absorber, one obtains the following formula:

$$K_1 = \frac{1}{\pi} \int_0^\pi \cos 2v e^{-\alpha \sin^2 v} dv \qquad (3)$$

It turns out that the integrals of Formulas (1) and (3) can be integrated because they are standard Bessel functions and reduce respectively to:

$$F_1 = e^{-\frac{\alpha}{2}} I_0 (\alpha/2) \qquad (4)$$

$$K_1 = e^{-\frac{\alpha}{2}} I_1 (\alpha/2) \qquad (5)$$

where $I_0 (\alpha/2)$ and $I_1 (\alpha/2)$ are the Modified Bessel functions of order zero and one.

A similar set of formulas for $F_2$ and $K_2$ may be derived for the assumption of a steady state case. For this case the intensity is constant in time and tthe density of the dye atoms in the absorbing state at any point is determined by the intensity at that point. With this assumption the following formula is obtained:

$$F_2 = \frac{2}{\lambda_0} \int_0^{\lambda_0/2} \frac{1}{1 + \beta \sin^2 k_0 x} dx \qquad (6)$$

In this formula $x$ indicates a linear dimension say beginning at the reflector 12 toward the right of FIG. 1. Finally, $\beta$ is defined as follows:

$$\beta = (\sigma/h\nu) i_{-o} \tau \qquad (7)$$

where $\tau$ is the spontaneous decay lifetime of a dye molecule in the bleached state, and the other symbols have been previously defined.

Similarly, a formula may be derived for $K_2$ as follows:

$$K_2 = \frac{2}{\lambda_0} \int_0^{\lambda_0/2} \frac{\cos 2k_0 x}{1 + \beta \sin^2 k_0 x} dx \qquad (8)$$

Similarly, the integrals of Formulas (6) and (8) can be integrated by a complex variable technique and reduce respectively to:

$$F_2 = 1/\sqrt{1+\beta} \qquad (9)$$

$$K_2 = 1/\sqrt{1+\beta} - (2/\beta) 1 - 1/\sqrt{1+\beta} \qquad (10)$$

Finally, the dissipation function of the cavity may be obtained as follows:

$$D(\lambda) = F - K(\cos 2\Delta k C) \sin \Delta k L / \Delta k L \qquad (11)$$

In this formula L is the length of the dye such as 20 while C is distance between the reflector 12 and the center 21 of the dye cell 20. Finally, $\Delta k$ may be defined as follows: $\Delta k = k - k_0$, where $k_0$ is defined as previously explained and $k$ is an adjacent unwanted mode.

Figure 3:
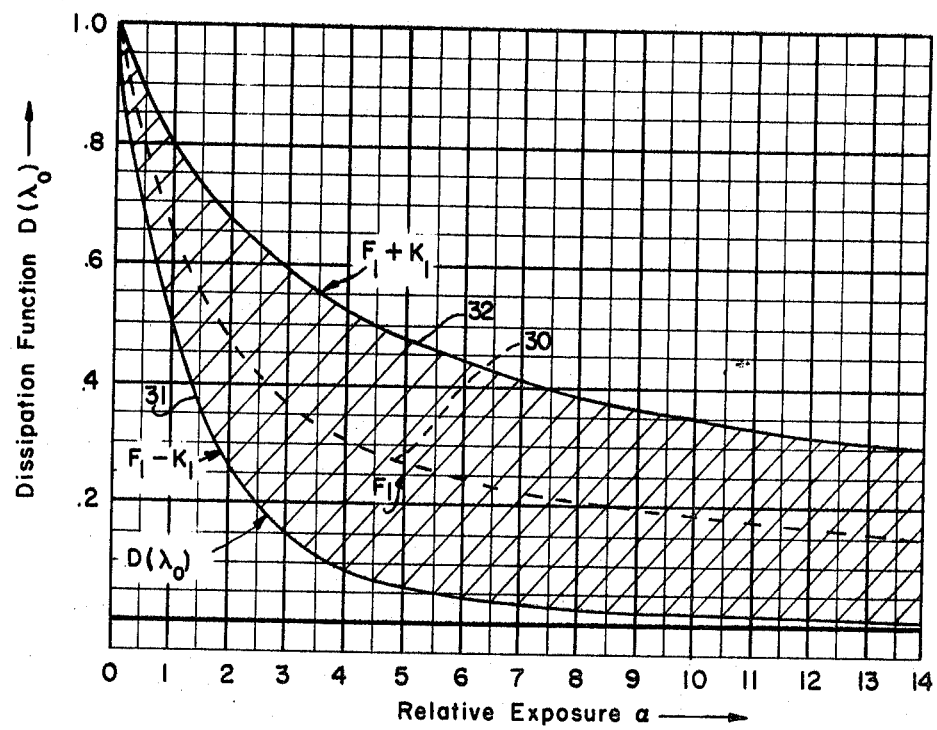
FIG. 3 is a graph illustrating generally the dissipation of the initial mode set up in the laser of the invention and the suppression of undesired modes as a function of the relative light exposure parameter, and which will be referred to in explaining the operation of the laser of the invention.

The dissipation function D as defined by Formula (11) is plotted in FIG. 3 to which reference is made. Here D is plotted as a function of the relative exposure $\alpha$ defined by Formula (2). Thus, curve 30 illustrates $F_1$ as defined by Formula (1). Curve 31 plots $F_1 - K_1$, where the function $K_1$ is defined by Formula (3), while curve 32 shows $F_1 + K_1$.

Thus, recalling the function D as defined by Formula (11), it will be noted that it includes a term of the form sin A/A. This function approaches one as A approaches zero. On the other hand, the cosine function (Formula 11) will vary between +1 and −1.

It will be evident that the last two factors of the formula approach one when $\Delta k$ approaches zero, that is when $k$ approaches $k_0$. This is ture when the undesired mode is very close to the desired mode or becomes equal thereto. In that case the cosine term also becomes +1 and Formula (11) is reduced to $D = F_1 - K_1$. This is, of course, curve 31.

Curve 31 accordingly shows the dissipation function or the loss of the desired mode as a function of the exposure time. As would be expected, the loss decreases very rapidly with exposure time which simply means the dye molecules are rapidly bleached to permit Q-switching of the laser.

For all other modes the cosine and sine terms of Formula (11) indicate that the dissipation function varies between $F_1 - K$ and $F_1 + K$, that is, between the curves 31 and 32 as shown by the shaded area.

What is desired, of course, is to arrange all parameters in such a manner that all undesired modes approach curve 32, that is, that the cosine term of Formula (11) becomes −1. This can be generally arranged for one particular undesired mode. Usually, however, the result is that other unwanted modes are near curve 31 rather than near curve 32, so that the discrimination against some other unwanted modes is very small.

It the unwanted modes are widely separated from the desired mode $\Delta k$ becomes relatively large. Therefore, the last term in Formula (11) approaches zero. As a result $D = F_1$, that is, such modes are located around curve 30 of FIG. 3.

The above analysis was based on the relative values of $k$ and $k_o$. It now becomes interesting to investigate the result of variations of C and L. It will be recalled that L was the length of the dye cell while C indicates the distance between reflector 12 and the center 21 of the dye cell 20.

It is also important to note that the total cavity length permits only a discrete family of modes. Specifically, $\Delta k = S(\pi/M)$, where M is the total cavity length between mirros 12, 14 and S is an integer.

A mathematical analysis of the dissipation of these various permitted modes, utilizing Formula (11), shows that the optimum suppression of all undesired modes occurs when L is equal to half the total length of the cavity and C is one quarter of the cavity length. Thus, the dye cell occupies one-half of the cavity.

For this configuration Formula (11) reduces to $D = F_1$ for all modes other than the initial mode, for which $D = F_1 - K_1$. This, of course, indicates that the initial or desired mode has a dissipation as shown by curve 31 while all other modes have a dissipation as shown by curve 30. This is, of course, the reason why a dye cell having a length of approximately ½ that of the optical cavity is preferred. It should be noted that the amount of discrimination between the desired mode as shown by curve 31, and all other undesired modes as shown by curve 30 is given by the vertical distance between the two curves.

On the other hand, assuming that the dye cell such as 20 is very thin, that is, a few millimeters thick; for such a cell the last portion of Formula (7) that is, the sine term, is very close to one for all wave lengths of interest. Therefore, the wave length structure is determined by the value of C. Accordingly, whenever $2\Delta kC = 2\pi$, the dissipation will be essentially at the same low value as that for the initial or desired mode. Accordingly, if the laser should oscillate at the two modes so defined, that is, at the initial mode and the one defined above, the coherence length of the output light will be 2C or multiples thereof. This will produce bright bands in a holographic image wherever the subject and reference paths differ by a multiple of 2C. Between these periodic bright bands will be dark bands and a contour map of the object is produced.

Thus, in the case of a thin dye cell, it is expected that the image of the object contains range contours. The interval of the range contour is equal to the distance from the dye cell to the 100 percent reflector or submultiplies of this distance.

The above brief discussion will indicate the importance of the length and position of the dye cell as well as the amount of discrimination which may be expected with a long dye cell in accordance with the present invention. It should be noted that experimental results have confirmed the predictions of theory.

Figure 4:
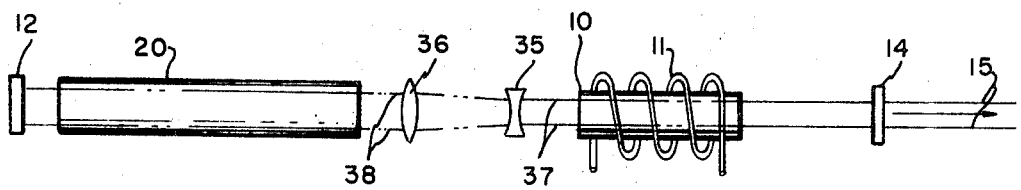
FIG. 4 is a schematic representation of a pulsed laser embodying a dye cell and a lens system between the laserable material and the dye cell in accordance with the present invention.

Referring now to FIG. 4 there is illustrated a pulsed laser in accordance with the present invention. The laser again includes a laserable material 10 such, for example, as a ruby rod with a flash lamp 11 disposed between two reflectors 12 and 14 which define an optical cavity. The reflector 14 is only partially reflective and hence passes an output beam 15. A dye cell 20 is again disposed as previously explained between the total reflector 12 and the laserable material 10. Again, instead of a single dye cell 20, two or more of the same length may be provided.

However, in accordance with the present invention there is provied a lens system which may, for example, include a negative lens 35 and a positive lens 36 which jointly provide a Galilean telescope. The telescope 35, 36 is so arranged that the laser beam 37 which issues from the laser rod 10 is enlarged and collimated as shown by the output beam 38. As a result an enlarged, collimated laser beam 38 passes through the dye cell 20.

It will be understood that any other lens system may be used instead and preferably an afocal lens system to avoid the difficulties encountered when a high energy laser beam is focused.

It will also be understood that instead of enlarging the laser beam the telescope 35, 36 may be so arranged as to reduce the cross-section of the beam.

In order to explain the purpose and the function of the telescope reference is again made to Formula (2) which is the relative exposure. This formula includes sigma which is the cross-section of the saturable absorber for the absorption or emission of light. The sigma, of course, is a property of the dye molecules. The alpha of Formula (2) in turn enters into Formula (1) which defines $F_1$.

It will be realized that the density of the dye molecules in the dye cell 20 must be so selected that the dye cell is initially moderately opaque to the optical radiation generated by the laser. The reason is that the Q of the cavity depends on the opaqueness of the saturable absorber which must be low so that the inverted population of the laserable material may build up during the initial phase of the pumping. On the other hand, this makes it difficult to control the alpha of Formula (2). In accordance with the present invention this is effected by controlling $i_0$ which is the light intensity per cross-section of the dye cell.

The Q of the optical cavity may be defined as follows:

$$1/Q = \pi n_o \sigma L/2\pi M \ D_{(\lambda)} \quad (1)$$

where $n_o$ is the initial density of the dye atoms, M is the total length of the optical cavity, and the other symbols are as previously defined. An examination of Formula (12) indicates that the initial dissipation is not affected by the presence of the beam expander telescope of the invention. On the other hand, the intensity of the light per cross-section within the dye cell, once lasing starts, will be affected by this beam expansion. Therefore, the excursion of the exposure parameter during a pulse can be controlled.

Thus, the lens system 35, 36 provided in accordance with the present invention between the laser rod 10 and the dye cell 20 provides a double control. In the first place, the dye concentration can be controlled for optimum opacity of the dye. On the other hand, the beam diameter can be controlled by the lens system so as to control the effective cross-section of the dye molecules to the optical radiation, which in turn controls the total amount of bleaching during the pulse.

The attenuation of the dye cell during the initial pumping period should be large enough to prevent lasing until a sufficient population inversion is created. Once that stage is reached the lasing begins and the independent control of the extent of bleaching is important in optimizing the coherence control of the dye cell. Excessive bleaching results in loss of mode control because the dissipations for unwanted modes is too small to prevent these unwanted modes from oscillating. Insufficient bleaching reduces the total light output from the laser.

It should once again be emphasized that the lens system 35, 36 may be used not only to expand the beam cross-section but also to reduce it as the occasion may require. This, of course, will depend on the particular dye used and on the necessary concentration of the dye to obtain a dye cell which is initially nearly opaque to the optical radiation.

There has thus been disclosed a pulsed laser having improved longitudinal mode control and thereby a much improved coherence length. This is effected by the use of a dye cell or dye cells having a length of no less than ¼ that of the optical cavity but preferably ½ the length of the cavity. A lens system is disposed between the dye cell and the laserable material for controlling the diameter of the beam passing through the dye cell. This permits an independent control of the concentration of the dye molecules in the cell and of the light intensity per cross-section of the cell. This makes possible an even more sophisticated control of the mode of the laser to discriminate against unwanted modes.

What is claimed is:

1. A pulsed laser capable of oscillating substantially in a single mode to improve the coherence length thereof, said laser comprising:
   a. a laserable material;
   b. means for pumping said laserable material to develop an optical radiation;
   c. a first and a second reflector for reflecting said optical radiation, said reflectors enclosing said laserable material and defining an optical cavity, said first reflector reflecting substantially all of said radiation and said second reflector reflecting only a portion of said optical radiation while transmitting the remainder thereof;
   d. dye cell means transparent to said optical radiation and disposed in said cavity adjacent said first reflector, said dye cell means containing a given density of the molecules of a saturable absorber capable of becoming, when excited, transparent to said optical radiation, and said dye cell means having a length of no less than ¼ of that of said cavity; and
   e. lens means disposed between said dye cell means and said laserable material, said lens means collimating the beam of said optical radiation passing through said laserable material and through said dye cell means and providing a ratio of the beam diameter passing through said laserable material to the beam diameter passing through said dye cell means to control the light intensity passing through a cross-section of said dye cell means so that said saturable absorber becomes substantially completely bleached at the antinodes of said optical radiation and remains substantially not bleached in the vicinity of the nodes of said radiation, thereby to optimize the coherence control provided by said dye cell.

2. A pulsed laser as defined in claim 1 wherein said laserable material consists of ruby.

3. A laser as defined in claim 1 wherein said lens means consists of a Galilean telescope for changing the diameter and thereafter collimating the beam of said optical radiation passing through said dye cell means.

4. A laser as defined in claim 3 wherein said Galilean telescope is so arranged as to increase the diameter of said optical radiation passing through said dye cell means compared to the diameter of said optical radiation passing through said laserable material.

* * * * *